(12) United States Patent
Decker

(10) Patent No.: US 6,541,916 B2
(45) Date of Patent: Apr. 1, 2003

(54) METHOD FOR PROVIDING DISCHARGE POWER TO ELECTRIC PROPULSION THRUSTERS

(75) Inventor: Darwin K. Decker, Hacienda Heights, CA (US)

(73) Assignee: TRW Inc., Redondo Beach, CA (US)

( * ) Notice: Subject to any disclaimer, the term of this patent is extended or adjusted under 35 U.S.C. 154(b) by 170 days.

(21) Appl. No.: 09/774,378

(22) Filed: Jan. 30, 2001

(65) Prior Publication Data

US 2002/0100841 A1 Aug. 1, 2002

(51) Int. Cl.⁷ .............................................. B64D 31/00
(52) U.S. Cl. ........................................... 315/77; 60/202
(58) Field of Search ....................... 315/111.01, 111.81, 315/219, 77; 60/202

(56) References Cited

U.S. PATENT DOCUMENTS 6,031,334 A * 2/2000 Meyer .................... 315/111.01

* cited by examiner

Primary Examiner—David Vu
(74) Attorney, Agent, or Firm—Harness, Dickey & Pierce, P.L.C.

(57) ABSTRACT

A satellite power distribution method for efficiently distributing power to satellite electric propulsion thrusters (24) is provided. The satellite includes spacecraft loads (20), an electric propulsion thruster (24), thruster auxiliary circuits (22), and a first power transformer (30). The first power transformer (30) has a primary winding (32) coupled to a first energy source (12) that supplies satellite power. A first secondary winding (36) of the first power transformer (30) is coupled to the spacecraft loads (20) for supplying primary power. The power distribution method includes the steps of first coupling a second secondary winding (34) to the first power transformer (30) for converting the satellite power to thruster discharge power which is rectified. The rectified discharge power is filtered to obtain power that is supplied to the electric propulsion thruster (24). Finally, satellite power is converted to auxiliary power for powering the thruster auxiliary circuits (22).

17 Claims, 2 Drawing Sheets

METHOD FOR PROVIDING DISCHARGE POWER TO ELECTRIC PROPULSION THRUSTERS

BACKGROUND OF THE INVENTION

1. Field of the Invention

The present invention relates generally to electric power subsystems for spacecraft and, more particularly, in particular to spacecraft that use electric propulsion thrusters.

2. Discussion of the Related Art

A critical component in spacecraft design is the configuration of the power subsystems that interface the spacecraft primary power and stored power to the spacecraft electronics assemblies. The power subsystems must convert and condition up to tens of kilowatts of power to be distributed to the spacecraft electronics loads and electric propulsion thrusters. Generally, separate spacecraft power components provide conditioned power to the electric thrusters and the spacecraft loads.

Typically, conventional spacecraft include a power bus having a voltage ranging from 20 volts to 50 volts DC for loads up to 5 kilowatts and a voltage range from 50 volts to 100 volts DC for loads above 5 kilowatts.

The electric thrusters can sometimes require up to 20 kilowatts of discharge power at voltages greater than 300 volts DC. To provide discharge power to the thrusters, conventional spacecraft include a power processor unit (PPU) that converts power from the primary power bus. Due to the massive power requirements, the multi-kilowatt PPUs that are used in conventional spacecraft to provide conditioned power to spacecraft electric thrusters are heavy and complex. As a result, the electric thruster PPUs result in significant cost, weight, and reliability penalties for the spacecraft.

While conventional satellite power subsystem configurations can be used to supply power to satellite control electronics and electric thrusters, those configurations have not proven capable of minimizing the potential cost and weight of the associated thruster PPUs.

SUMMARY OF THE INVENTION

The present invention provides a satellite power distribution method for efficiently providing power to spacecraft electric propulsion thrusters. The satellite includes a primary energy source, an energy storage source, spacecraft loads, an electric propulsion thruster, thruster auxiliary circuits, a primary energy source controller, and an energy storage controller. The primary energy source controller and the energy storage controller each contain a power transformer. Each power transformer has a primary winding coupled to its energy source that supplies satellite power. A first secondary winding of each power transformer is coupled to the spacecraft loads for supplying primary power. The power distribution method also includes a second secondary winding on each power transformer for converting the satellite power to thruster power which is rectified. The rectified thruster power is filtered to obtain discharge power that is supplied to the electric propulsion thruster. Finally, satellite power is converted to auxiliary power for powering the thruster auxiliary circuits.

For a more complete understanding of the invention, its objects and advantages, reference may be had to the following specification and to the accompanying drawings.

DETAILED DESCRIPTION OF THE PREFERRED EMBODIMENT

Figure 1:
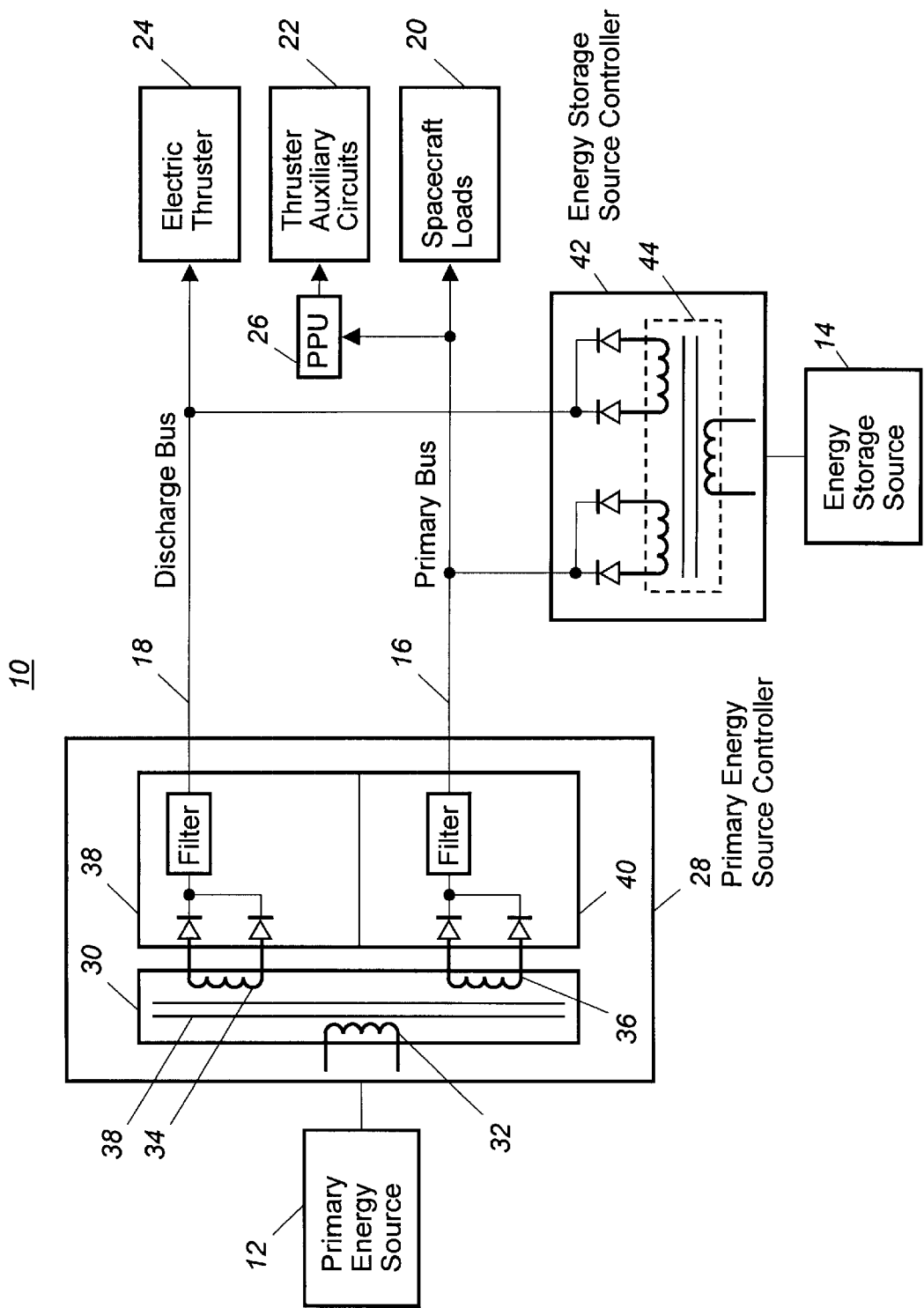
FIG. 1 illustrates a block diagram of a satellite power distribution system in accordance with the teachings of the invention.

Referring to FIG. 1, a spacecraft power system 10 according to the present invention is shown. The power system 10 links the power consuming assemblies of a spacecraft to one or more spacecraft energy sources such as primary energy sources and energy storage sources. Examples of spacecraft energy sources include solar arrays, batteries, and flywheel energy sources. The energy sources employed in a spacecraft typically provide unregulated power at differing voltage levels. The spacecraft power system converts energy from the energy sources into power that is usable by the spacecraft assemblies such as spacecraft loads, electric propulsion thrusters, and thruster auxiliary circuits.

In the presently preferred embodiment of the invention, the spacecraft power system 10 converts and conditions energy from a primary energy source 12 and an energy storage source 14 into usable power. The primary energy source 12 in the presently preferred embodiment is a solar array. However, the scope of the invention is not limited to merely solar arrays, but encompasses using other primary energy sources such as generators. The energy storage source 14 in the presently preferred embodiment is a flywheel circuit. However, the scope of the invention encompasses using other energy storage sources such as batteries.

A primary energy source controller 28 converts energy from the primary enegy source 12 to primary power and electric thruster discharge power. The primary power and thruster discharge power are respectively coupled to a primary bus 16 and a discharge bus 18 for distribution to the spacecraft assemblies. The primary energy source controller 28 includes a power transformer 30 coupled through a power conversion circuit (not shown) to the primary energy source 12. The power transformer efficiently level shifts a chopped waveform from the power conversion circuit to predetermined voltage levels for the primary power and discharge power.

The power transformer 30 includes a primary winding 32 and at least two secondary windings 34 and 36 wound on a core 38. The primary winding 32 is coupled to the power conversion circuit. Energy flowing from the primary energy source 12 through the power conversion circuit is coupled from the primary winding 32 through the core 38 and into the secondary windings 34 and 36. The secondary windings 34 and 36 couple the energy through rectifier and filter circuits 38 and 40 to the discharge bus 18 and primary bus 16 respectively.

The secondary windings 34 and 36 are preferably wound to separately interface with rectifier circuits 38 and 40 arranged in a full-bridge configuration. However, the scope the invention includes other winding configurations such as a full wave configuration, separate center-tapped windings and a single center-tapped winding.

A control circuit (not shown) controls the flow of energy through the transformer such that the primary power flowing to the primary bus 16 is regulated. Providing regulated power on the primary bus 16 provides many advantages including reducing the complexity and size of subsequent power conversion stages. In the presently preferred embodiment, the discharge power flowing on the discharge bus 18 is unregulated. Due to coupling between windings 34 and 36, the discharge power will loosely track variations of the primary power that occur due to input power changes. Although, discharge power in the presently preferred embodiment is unregulated, it is within the scope of the invention to regulate the discharge power using techniques such as multiple loop control, switched loop control, and post regulators.

The primary power is coupled through the primary bus 16 to the spacecraft loads 20 and a power processor unit (PPU) 26. The spacecraft loads 20 include circuits that use primary power directly as well as power conversion circuits that transform primary power to levels compatible with subsequent circuitry.

The PPU 26 provides low power conditioning for thruster auxiliary circuits 22 such as cathode heaters, ignition circuits, steering coils, flow valves, and thermal throttle power for the thruster. The PPU 26 converts regulated prime power from the primary bus 16 to power that is usable by the thruster auxiliary circuits 22. It is also within the scope of the invention for the PPU 26 to convert discharge power instead of primary power or in addition to primary power. The PPU 26 of the present invention does not provide discharge power for powering the electric thruster 24. Instead, discharge power is coupled through the discharge bus 18 to the electric propulsion thruster 24. The present invention recognizes that providing discharge power from a secondary winding on the power transformer 30 through a discharge bus 18 to the electric thruster 24 results in several advantages including decreased cost, weight, and complexity of delivering power to the electric thrusters 24.

The synergistic cost and weight benefits are derived by eliminating the need for discharge power supplies within the PPUs. Projected power requirements for discharge power to drive electric propulsion thrusters range from 10 kilowatts for station keeping of geosynchronous communications satellites to 100 kilowatts for applications such as the space tug and the power tower. Between 50% to 70% of the projected PPU weight can be eliminated by using the described direct drive approach depending on the rated output power. Using a figure of merit of 200 watts per kilogram of PPUs, a weight savings of 35 kg can be projected for a geosynchronous spacecraft.

An energy storage source controller 42 converts energy from the energy storage source 14 to primary power and discharge power. The primary power and discharge power are respectively coupled to the primary bus 16 and the discharge bus 18 for distribution to the spacecraft assemblies. Similarly to the energy source controller 28, the energy storage controller 42 includes a power transformer 44 coupled through a power conversion circuit (not shown) to the energy storage source 14. The power transformer 44 efficiently level shifts a chopped waveform from the power conversion circuit to predetermined voltage levels for the primary power and discharge power.

Figure 2:
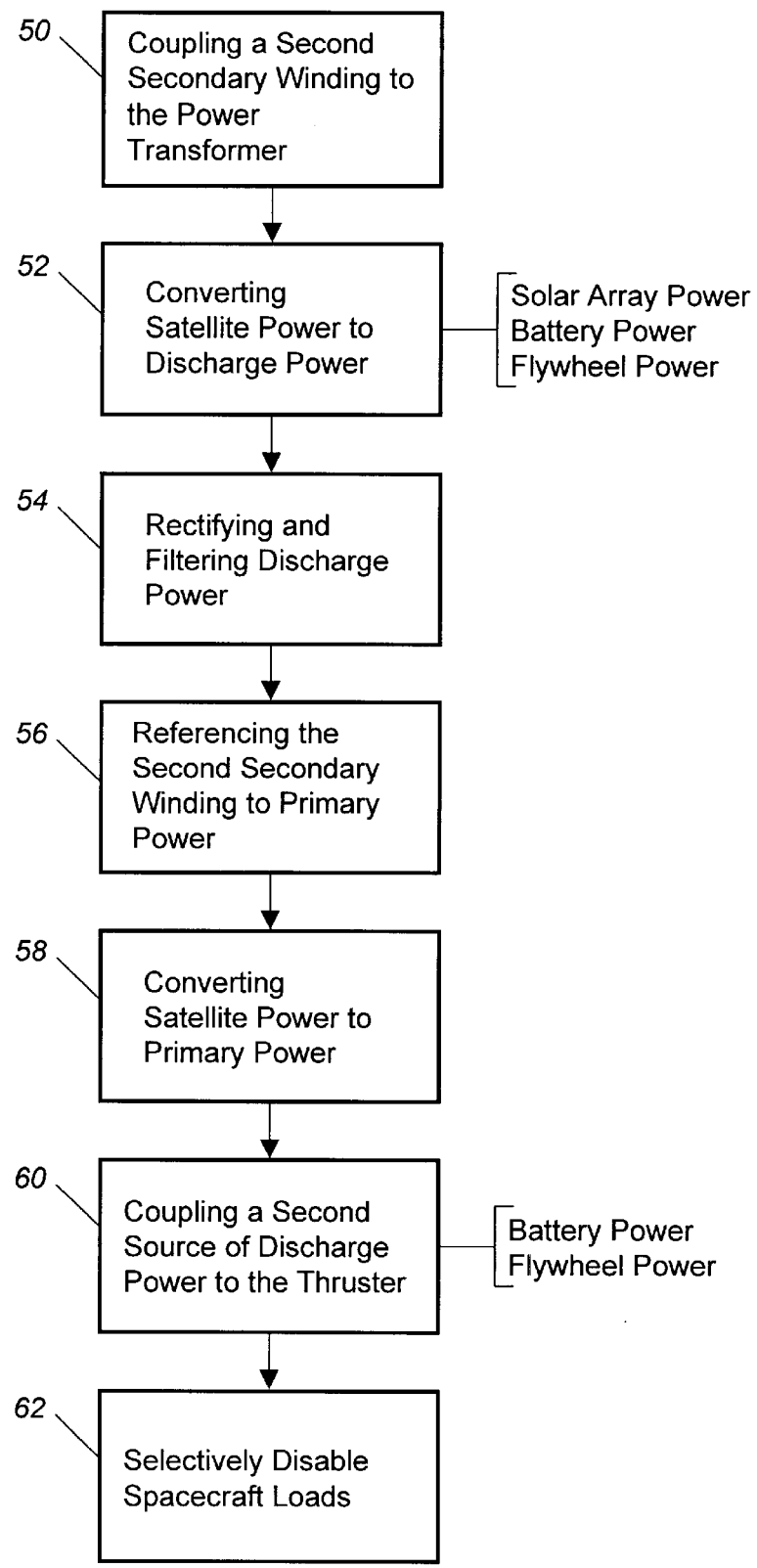
FIG. 2 illustrates a flow diagram of a satellite power distribution method in accordance with the teachings of the invention.

Referring to FIG. 2, a flow diagram illustrating a method of providing discharge power to electric propulsion thrusters in accordance with the teachings of the invention is illustrated. At step 50 a second secondary winding is provided on the power transformer 30. At step 52 satellite power is converted to primary power and discharge power. At step 54 discharge power is rectified and filtered. At step 56 the second secondary winding is referenced to primary power. At step 58 primary power is converted to auxiliary power for powering the thruster auxiliary circuits 22. At step 60 a second source of discharge power is coupled to the thruster 24 through the discharge bus 18. The second source of discharge power may be either a primary or secondary power source such as generators, batteries, and flywheels. At step 62 electronics loads are selectively disabled during predetermined system 10 operating modes to even out the flow of power through the power transformer 30, thereby permitting the controllers 28 and 42 to be sized smaller. The capability of deriving discharge power from either the primary power source 12 or the energy storage source 14 provides flexibility in the use of the thruster 24 during sunlight or eclipse periods. For certain spacecraft missions, only one of the power sources may be necessary to provide thruster power. Since electric propulsion is used primarily for orbit transfer and station keeping, spacecraft loads 20 can be turned off during these events, resulting in reduced flow of power through the controllers 28 and 42. Thus, the modified power source controller 28 and energy storage controller 42 can be sized to provide the worst-case of either primary power or thruster power, thereby reducing the required power processing cost and weight.

Thus it will be appreciated from the above that as a result of the present invention, a method for supplying power to satellite electric propulsion thrusters is provided by which the principal objectives, among others, are completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. A method for distributing power to a satellite having spacecraft loads, an electric propulsion thruster and thruster auxiliary circuits, the satellite including a first power transformer having a primary winding coupled to a primary energy source that supplies satellite power and a first secondary winding coupled to the spacecraft loads for supplying primary power, comprising:

a) providing a second secondary winding for the first power transformer;
   b) converting the satellite power to thruster discharge power via the first power transformer second secondary winding;
   c) rectifying the discharge power;
   d) filtering the rectified discharge power;
   e) supplying the discharge power to the electric propulsion thruster; and
   f) converting satellite power to auxiliary power for powering the thruster auxiliary circuits.

2. The method of claim 1 wherein the primary energy source is a solar array.

3. The method of claim 1 wherein the primary energy source is a generator.

4. The method of claim 1 further comprising:

g) providing a second source of discharge power coupled to the electric propulsion thruster such that the electric propulsion thruster is powered alternatively from the first transformer and the second source of discharge power.

5. The method of claim 1 further comprising:
   selectively disabling the spacecraft loads.

6. A method for distributing power to a satellite having spacecraft loads, an electric propulsion thruster and thruster auxiliary circuits, the satellite including a first power transformer having a primary winding coupled to a primary energy source that supplies satellite power and a first secondary winding coupled to the spacecraft loads for supplying primary power, comprising:
 a) providing a second secondary winding for the first power transformer;
 b) converting the satellite power to thruster discharge power via the first power transformer second secondary winding;
 c) rectifying the discharge power;
 d) filtering the rectified discharge power;
 e) supplying the discharge power to the electric propulsion thruster; and
 f) converting a portion of primary power to auxiliary power for powering the thruster auxiliary circuits.

7. A method for distributing power to a satellite having spacecraft loads, an electric propulsion thruster and thruster auxiliary circuits, the satellite including a first power transformer having a primary winding coupled to a primary energy source that supplies satellite power and a first secondary winding coupled to the spacecraft loads for supplying primary power, comprising:
 a) providing a second secondary winding for the first power transformer;
 b) converting the satellite power to thruster discharge power via the first power transformer second secondary winding;
 c) rectifying the discharge power;
 d) filtering the rectified discharge power;
 e) supplying the discharge power to the electric propulsion thruster; and
 f) converting a portion of discharge power to auxiliary power for powering the thruster auxiliary circuits.

8. A method for distributing power to a satellite having spacecraft loads, an electric propulsion thruster and thruster auxiliary circuits, the satellite including a first power transformer having a primary winding coupled to an energy source that supplies satellite power and a first secondary winding coupled to the spacecraft loads for supplying primary power, comprising:
 a) providing a second secondary winding for the first power transformer;
 b) converting the satellite power to thruster discharge power via the first power transformer second secondary winding;
 c) rectifying the discharge power;
 d) filtering the rectified discharge power;
 e) supplying the discharge power to the electric propulsion thruster;
 f) converting satellite power to auxiliary power for powering the thruster auxiliary circuits; and
 g) driving the first power transformer primary winding by the energy source selected from a group of primary energy sources and energy storage sources.

9. A method for distributing power to a satellite having spacecraft loads, an electric propulsion thruster and thruster auxiliary circuits, the satellite including a first power transformer having a primary winding coupled to a primary energy source that supplies satellite power and a first secondary winding coupled to the spacecraft loads for supplying primary power, comprising:
 a) providing a second secondary winding for the first power transformer;
 b) converting the satellite power to thruster discharge power via the first power transformer second secondary winding;
 c) rectifying the discharge power;
 d) filtering the rectified discharge power;
 e) supplying the discharge power to the electric propulsion thruster;
 f) converting satellite power to auxiliary power for powering the thruster auxiliary circuits;
 g) providing a second power transformer powered from a second energy source;
 h) providing a secondary winding coupled to the second power transformer for converting the satellite power to thruster discharge power;
 i) rectifying the discharge power;
 j) filtering the rectified discharge power; and
 k) supplying the discharge power to the electric propulsion thruster.

10. A satellite power distribution method for distributing power to a satellite having spacecraft loads, an electric propulsion thruster and thruster auxiliary circuits, the satellite including a first power transformer having a primary winding coupled to a primary source that supplies satellite power and a first secondary winding coupled to the spacecraft loads for supplying primary power, comprising the steps of:
 coupling a second secondary winding to the first power transformer;
 converting the satellite power to thruster discharge power via the first power transformer second secondary winding;
 rectifying the discharge power;
 filtering the rectified discharge power;
 supplying the discharge power to the electric propulsion thruster;
 converting satellite power to auxiliary power for powering the thruster auxiliary circuits; and
 providing a second source of discharge power coupled to the electric propulsion thruster such that the electric propulsion thruster is powered alternatively from the first transformer and the second source of discharge power.

11. The power distribution method of claim 10 comprising driving the first power transformer primary winding by a first energy source selected from a group of primary energy sources and energy storage sources.

12. The power distribution method of claim 11 wherein the primary energy source is a solar array.

13. The power distribution method of claim 11 wherein the energy storage source is a flywheel storage system.

14. A satellite power distribution method for distributing power to a satellite having spacecraft loads, an electric propulsion thruster and thruster auxiliary circuits, the satellite including a first power transformer having a primary winding coupled to a first energy source that supplies satellite power and a first secondary winding coupled to the spacecraft loads for supplying primary power, comprising the steps of:
 coupling a second secondary winding to the first power transformer;
 converting the satellite power to thruster discharge power via the first power transformer second secondary winding;
 rectifying the discharge power;
 filtering the rectified discharge power;
 supplying the discharge power to the electric propulsion thruster;

converting satellite power to auxiliary power for powering the thruster auxiliary circuits; and providing a second source of discharge power coupled to the electric propulsion thruster such that the electric propulsion thruster is powered alternatively from the first transformer and the second source of discharge power;

providing a second power transformer powered from a second energy source;

providing a secondary winding coupled to the second power transformer for converting the satellite power to thruster discharge power;

rectifying the discharge power;

filtering the rectified discharge power; and supplying the discharge power to the electric propulsion thruster.

15. The power distribution method of claim 14 wherein the step of converting includes converting a portion of discharge power to auxiliary power for powering the thruster auxiliary circuits.

16. The power distribution method of claim 12 further comprising the step of:

selectively disabling the spacecraft loads.

17. A satellite power distribution system for distributing satellite power to a satellite having spacecraft loads, an electric propulsion thruster and thruster auxiliary circuits, comprising:

a first power transformer for converting satellite power to primary power and discharge power, the first power transformer including a primary winding coupled to a primary energy source that supplies satellite power;

a first secondary winding coupled through a primary bus to the spacecraft loads for supplying primary power, and a second secondary winding coupled through a discharge bus to the electric propulsion thruster for supplying thruster power;

a second power transformer for converting satellite power to primary power and thruster power, including a primary winding coupled to an energy storage source that supplies satellite power;

a first secondary winding coupled through a primary bus to the spacecraft loads for supplying primary power, and a second secondary winding coupled through a discharge bus to the electric propulsion thruster for supplying thruster power; and a power processing unit for converting satellite power to auxiliary power to power the thruster auxiliary circuits.

* * * * *